United States Patent Office.

JAMES WEBSTER, OF BIRMINGHAM, ENGLAND.

Letters Patent No. 103,109, dated May 17, 1870; antedated May 4, 1870.

IMPROVEMENT IN THE MANUFACTURE AND PURIFYING OF IRON.

The Schedule referred to in these Letters Patent and making part of the same

*To all whom it may concern:*

Be it known that I, JAMES WEBSTER, of Birmingham, in the county of Warwick, England, engineer, have invented certain Improvements in the manufacture of Gas and Vapor, and in applying such gas and vapor in manufacturing and refining iron and other metals, and in recovering certain products therefrom; and I do hereby declare that the following is a full and exact description of the said improvements or invention, that is to say—

In carrying out the first part of my invention I force atmospheric air through or over hydrocloric acid, for the purpose of taking up hydrocloric-acid gas or vapor with the atmosphere, for applying such gas or vapor in the manufacture or refining of iron, steel, copper, or nickel, and the like, while such metals are in a fluid or molten condition.

In carrying out the second part of my invention I cause atmospheric air, in a cold or heated state, to be forced into or over hydrocloric acid, and then through wood, naphtha, or mineral turpentine, or volatile spirit, for the purpose of taking up hydrogen and carbon gas or vapor, or hydrogen and a portion of the carbon from the volatile spirit. I then force such gas or vapor through, into, or over the metals, while the latter are in a molten state, during the manufacture or refining thereof, for the purpose of taking up sulphur, phosphorus, silica, or carbon, or other impurities which the metal may contain.

In carrying out this part of my invention, I also cause atmospheric air mixed with steam, in about equal proportions, to be forced through or over hydrocloric acid, and then through or over wood, naphtha, or volatile spirit, as before stated, then through or over water, and then cause the gas or vapor to be forced into or over the said metals, (while in a molten state,) for the purpose of refining them by taking up the sulphur, phosphorus, carbon, silica, or other impurities therein.

In carrying out this part of my invention in its application to articles of wrought-iron finished or partially finished, which require to be case-hardened, or their surfaces steeled or hardened to a certain depth, I place such articles in a closed receptacle capable of being heated to a red heat. The articles and receptacle being then so heated, I cause the gases or vapors before mentioned to be forced into and through the said receptacle and over and among the articles therein for a greater or lesser length of time, according as the thickness of the hardened skin may require.

In carrying out the said improvements I recover certain of the products, such as precipitated carbon and ammonia.

I claim the processes and applications in the manufacture and refining of iron and other metals, substantially as herein described.

JAMES WEBSTER.

Witnesses:
    WILLIAM BULL,
        47 *Chancery Lane, London,*
    WILLIAM COOK,
        1 *Quality Court, Chancery Lane, London.*